United States Patent [19]
Hanning

[11] 3,861,841
[45] Jan. 21, 1975

[54] MACHINE FOR THE INJECTION MOLDING OF A MIXTURE OF PLASTICIZED SYNTHETIC MATERIAL

[76] Inventor: Robert Hanning, Cavernago Parc 1, Campione D'Italia, Italy

[22] Filed: June 13, 1972

[21] Appl. No.: 262,282

[30] Foreign Application Priority Data
June 14, 1971 Germany............................ 2129348

[52] U.S. Cl................. 425/146, 425/166, 425/245, 425/248, 425/DIG. 224, 425/DIG. 225
[51] Int. Cl.............................................. B29f 1/00
[58] Field of Search .. 425/245, 247, 248, DIG. 224, 425/DIG. 225, DIG. 226, 146, 166

[56] References Cited
UNITED STATES PATENTS

| | | | |
|---|---|---|---|
| 2,031,786 | 2/1936 | Oldham | 425/248 |
| 2,265,995 | 12/1941 | Beyerlein | 425/DIG. 226 |
| 2,734,226 | 2/1956 | Willert | 425/166 X |
| 3,097,396 | 7/1963 | Ludwig | 425/DIG. 224 |
| 3,241,191 | 3/1966 | Novel | 425/DIG. 225 |
| 3,357,049 | 12/1967 | Spindler | 425/146 |
| 3,401,426 | 9/1968 | Evans | 425/DIG. 226 |
| 3,555,618 | 1/1971 | Cooper | 425/245 X |
| 3,571,856 | 3/1971 | Voelker | 425/DIG. 225 |
| 3,659,997 | 5/1972 | Rees | 425/247 |

*Primary Examiner*—Andrew R. Juhasz
*Assistant Examiner*—Robert J. Craig
*Attorney, Agent, or Firm*—Ernest G. Montague; Karl F. Ross; Herbert Dubno

[57] ABSTRACT

An apparatus for producing particularly large-surface objects by injection-molding in a mold a mixture of plasticized synthetic material and a foaming agent, which comprises the steps of feeding the mixture to a plurality of complete injection-molding units, each including an injection-molding cylinder, an injection molding piston reciprocating in the cylinder and an injection-molding nozzle. The mixture is injected through all injection-molding nozzles by means of the individual injection-molding pistons into a mold.

4 Claims, 1 Drawing Figure

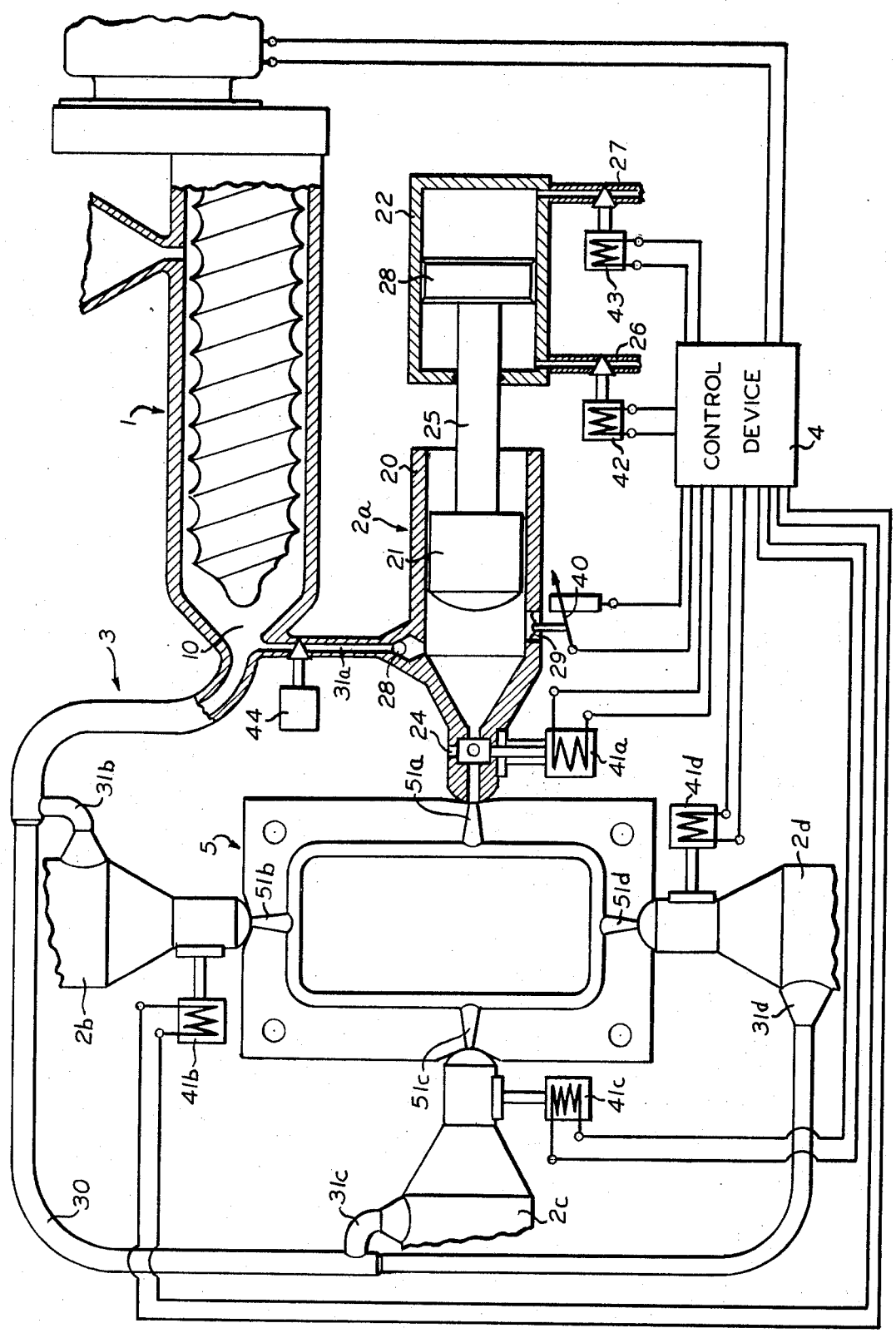

MACHINE FOR THE INJECTION MOLDING OF A MIXTURE OF PLASTICIZED SYNTHETIC MATERIAL

The present invention relates to an apparatus for the production of particularly large-surface-area objects by injection-molding of a mixture of plasticized synthetic material and an expanding agent.

The expanding agent contained in the liquid mixture remains bound only at a certain minimum pressure and escapes upon pressure reduction. This is the case when the mixture standing under high pressure within the closed nozzle is suddenly depressurized by opening of the nozzle. The gas-like expanding or foaming agent can then escape through the split between the mold parts, until the split is sealed by the solidified melt. The degree of foaming is thus reduced and the specific weight of the solidified mold part is increased, as the injection duration is increased. Foam injection-molded parts, which are produced in accordance with conventional methods for the injection-molding of compact parts, thus do not show the desired cell structure, in particular when one deals with parts of large surface area.

In order to avoid this drawback, it is proposed to arrange feeding channels or distributors in the mold or outside of the mold, which channels or distributors are connected with the plasticizing- and injection-molding unit and terminate in a nozzle. By this arrangement the injection-molding time period can be somewhat shortened; yet there remain long paths with turns, which can have an appreciable pressure reduction as a consequence, which favors an escape of the foaming agent, which causes a nonuniform cell structure inside the molded object, and which interferes with the smoothness of the surface and the desired non-cellular surface structure.

It is one object of the present invention, to provide an apparatus for the production of particularly large-surface objects by injection-molding of a mixture of plasticized synthetic material and a foaming agent, whereby the injection-molding of large-surface parts is possible with a uniform low specific weight and with a smooth, pore-free surface.

According to the present invention a mixture of plasticized synthetic material and foaming agent is fed to a plurality of complete injection-molding devices which each have an injection-molding cylinder, an injection-molding piston and an injection-molding nozzle, and is injection molded from all of the injection-molding nozzles by means of the individual injection-molding pistons into the common mold.

With this arrangement, it is possible that in the shortest injection-molding time, at all entrance openings of the mold, the same optimal conditions for the mixture to be injection molded are created with respect to pressure and temperature. Moreover the paths of the mixture in the mold are appreciably shortened, and the injection-molding time is reduced to a fraction of the conventional time.

The shortest injection-molding time is obtained if, simultaneously from all injection-molding devices, molding is performed. In some cases, it can be desirable, however, to displace in time the start of the different injection-molding processes slightly relative to each other, in particular in case of certain complicated molds.

The machine according to the present invention, which is equipped with any known plasticizing- and mixing device, comprises a plurality of complete injection-molding devices, which are individually adjustable and controllable, and which each have one injection-molding cylinder equipped with at least one injection-molding nozzle. In each cylinder an injection-molding piston is subjected to pressure on either side; the nozzles are connected with the exit side of the plasticizing- and-mixing device and arranged in such a manner that the individual injection-molding cylinders and their nozzles or their entrance openings can be brought into operative connection with the entrance openings of the mold Another feature of the present invention provides a single adjustment- and-control device for the adjustment and control of the plasticizing- and-mixing device in the different injection-molding devices with respect to pressure, temperature and time.

These and other objects will become more readily apparent from the following detailed description, reference being made to the accompanying drawing, in which the sole FIGURE is a section of the machine.

The machine comprises substantially a plasticizing- and mixing-device 1, a plurality of injection-molding units 2a, 2b, 2c and 2d, which are connected by means of a feed system 3 with the plasticizing- and-mixing device 1, and an adjustment- and-control device 4. The plasticizing- and-mixing device is equipped with a plasticizing worm, to which the foaming agent is fed in any state and in any manner.

Each of the shown injection units, 2a, 2b, 2c, 2d comprises an injection-molding cylinder 20 and an injection-molding piston 21, an injection-molding nozzle 24, and a piston drive, which is formed of a driving cylinder 22 and a hydraulically or pneumatically operated piston 23, which is connected by means of a piston rod 25 with each injection-molding piston 21. The individual driving cylinders 20 are connected by means of conduits 26 and 27 with a hydraulic or pneumatic pressure source (not shown).

The feeding system, which can be designed in any selected manner and is connected at 10 to the plasticizing- and-mixing device 1, can consist of a main conduit 30, from which individual branch-conduits 31b, 31c and 31d lead to the respective injection-molding cylinders 2b, 2c, and 2d. It is also possible, as can be ascertained from the drawing, to provide a tap conduit 31 from the plasticizing- and-mixing unit directly to an injection-molding cylinder 2a. At the end of the branch a return or check valve 28 is provided which prevents the the mixture from being pressed backwards into the conduit system.

In the control device 4, all impulses which arrive from the measuring points of the plasticizing- and-mixing unit, run together to the individual injection-molding units, and to the feeding system and form the basis for the adjustment or control. For the sake of clearer demonstration, only a membrane pressure meter 40 as a control device is shown in the drawing; the meter 40 is disposed in a bore 29 of the injection-molding cylinders 20 and measures the pressure in the injection-molding cylinders. The pressure itself can be influenced by operation of magnet valves 42 and 43, which are built in the pressure medium conduits 26 and 27 and cause application of pressure to the piston 23 on the front side and the back side. the nozzles 24 are operated in the embodiment shown in the drawing by magnetic valves 41a, 41b, 41c, 41d, which open the injection-molding nozzles only upon reaching a predetermined, settable pressure in the injection-molding cylinder.

The necessary feeding devices for the plasticizing-and-mixing device, the injection-molding devices 2 and the feeding system 3, are not shown in the drawing, since they do not constitute part of the present invention and are conventional.

In accordance with another feature of the present invention, in the individual branch conduits 31a, 31b, 31c, and 31d, stop valves, preferably magnet valves 44, are arranged, through which the branch conduits can be locked individually, so that molds with different injection-molding openings can be connected. A further advantage results in the fact that a high-power machine, if it is equipped with a large-surface mold, can be used as a multiple machine. Thus, in one machine with a plurality of injection-molding units and one or a plurality of mold-closing units, a plurality of mold cavities can be provided. Thanks to the independent adjustment and control, it is possible that the individual molds are filled sequentially, so that the plasticizing-and -mixing unit practically operates continuously and the output of finished molded objects is correspondingly multiplied.

The mold 5, shown in the example of the drawing, with the injection openings 51a, 51b, 51c, 51d, as well as the four injection-molding units, are shown in the vertical plane only for the purpose of a better demonstration. A horizontal arrangement can also be provided in order to eliminate the influence of gravity upon the formation of the cell structure.

I claim:

1. An injection-molding machine comprising:

a plasticizing- and-mixing device having an output side;

a mold provided with a plurality of injection openings distributed about said mold on different sides thereof;

a plurality of complete individually adjustable and controllable injection-molding units each including an injection-molding cylinder equipped with at least one injection-molding nozzle communicating with one of said injection openings and distributed around said mold;

a respective injection-molding piston reciprocating in each of said injection-molding cylinders and adapted to be subjected to pressure alternately on both sides thereof;

a ring-feeding system extending around said mold and including a plurality of conduits operatively connecting said output side of said plasticizing-and-mixing device with said injection-molding units such that said individual injection-molding cylinders and their nozzles are in operative connection with said injection openings of said mold;

a single control- and-adjusting device for the control and adjustment of said plasticizing- and-mixing device and of said respective injection-molding units responsive to pressure, temperature and time;

piston drive means operatively connected to each of said injection-molding pistons, the piston drive means being hydraulically controlled by said control- and-adjusting device;

first valve means for each of said piston drive means actuated by said control- and-adjusting device for individually switching off a corresponding one of said injection-molding units;

second valve means for closing each of said conduits to the respective injection-molding units;

third valve means for closing said injection-molding nozzles of each of said plurality of injection-molding units; and pressure measuring means operatively connected to said injection-molding units and to said control-and-adjusting device for controlling all of said valve means in dependence upon pressure, time and path.

2. The machine, as set forth in claim 1, which includes closure means for closing individually each of said conduits to said respective injection-molding units.

3. The machine, as set forth in claim 1, further comprising magnetic valve means for closing said at least one injection-molding nozzle of each of said plurality of injection-molding units.

4. The machine, as set forth in claim 1, wherein said cylinder of each of said injection molding units defines a filling space communicating with said at least one injection-molding nozzle, said filling space having a diameter substantially larger than that of said at least one injection-molding nozzle.

* * * * *